United States Patent

Bäbler

Patent Number: 5,104,918
Date of Patent: Apr. 14, 1992

[54] PERYLENETETRACARBOXYLIC ACID DIIMIDES HAVING LONG-CHAIN RADICALS CONTAINING CARBONYL GROUPS

[75] Inventor: Fridolin Bäbler, Marly, Switzerland
[73] Assignee: Ciba-Geigy Corporation, Ardsley, N.Y.
[21] Appl. No.: 587,292
[22] Filed: Sep. 24, 1990

Related U.S. Application Data

[60] Division of Ser. No. 384,896, Jul. 24, 1989, Pat. No. 4,978,755, which is a continuation of Ser. No. 164,695, Mar. 7, 1988, abandoned.

[30] Foreign Application Priority Data

Mar. 13, 1987 [CH] Switzerland .......................... 954/87

[51] Int. Cl.$^5$ .................. C08K 5/3437; C07D 221/18
[52] U.S. Cl. ......................................... 524/90; 546/37
[58] Field of Search ......................................... 524/90

[56] References Cited

U.S. PATENT DOCUMENTS 4,238,386 12/1980 Bäbler .................................. 524/90

FOREIGN PATENT DOCUMENTS 3413418 10/1985 Fed. Rep. of Germany ...... 552/220

Primary Examiner—Joseph L. Schofer
Assistant Examiner—Wu C. Cheng
Attorney, Agent, or Firm—Harry Falber

[57] ABSTRACT

Perylene-3,4,9,10-tetracarboxylic acid diimides of the formula I

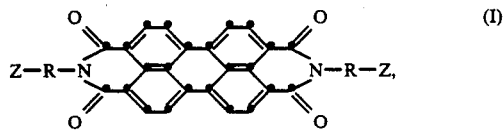

in which R is a linear or branched alkylene, alkylenecycloalkylene or cycloalkylenealkylene radical which has at least 15 C atoms and which is interrupted by one or two —COO—, —OOC—, —CONH— and/or —NHCO— groups, and Z is hydrogen, hydroxyl or a —COOH group.

Perylene diimides of this type are excellently suitable for coloring polyolefins. In this regard, they are particularly distinguished by their low tendency to bloom. They are also very suitable for coloring engineering plastics, in which they produce fluorescent colorations having a high fluorescence and excellent fastness to heat, light and weathering.

4 Claims, No Drawings

PERYLENETETRACARBOXYLIC ACID DIIMIDES HAVING LONG-CHAIN RADICALS CONTAINING CARBONYL GROUPS

This is a divisional of application Ser. No. 384,896 filed on July 24, 1989, now U.S. Pat. No. 4,978,755, which is a continuation of Ser. No. 164,695 filed on Mar. 7, 1988, now abandoned.

The present invention relates to perylenetetracarboxylic acid diimides having, attached to both N atoms, long-chain aliphatic radicals containing one or two carboxyl and/or carbamoyl groups, and to their use for colouring polyolefins.

N,N'-Dialkylperylene-3,4,9,10-tetracarboxylic acid diimides having long-chain alkyl radicals are known from European Patent Specification 6,122 for colouring polyolefins. These products do not, however, always meet the present requirements of the art, on the one hand owing to their tendency to bloom and, on the other hand, in respect of their fastness properties to wet processing.

German Auslegeschrift 1,916,169 describes perylene-3,4,9,10-tetracarboxylic acid diimides which are substituted at both N atoms by fairly short aliphatic radicals containing a carboxyl group, for example N,N'-bis-(5-ethoxycarbonylpentyl)-perylene diimide, and their use for colouring polyesters and polyamides. Pigments of this type are not suitable for colouring polyolefins.

Resin dyes based on perylene diimides which are substituted at both N atoms by polyamide chains having at least 4 carbamoyl groups are described in USSR Patent Specification 703,554 as colorants for colouring polyurethane foam, polyesters and polyamides. Colouring substances of this type are not suitable for colouring polyolefins either.

It has now been found that perylene diimides containing, attached to both N atoms, aliphatic radicals containing one or two carboxyl and/or carbamoyl groups and having at least 15 C atoms are, surprisingly, very suitable for colouring polyolefins and exhibit a low tendency to bloom and excellent fastness properties to wet processing.

The present invention accordingly relates to perylene-3,4,9,10-tetracarboxylic acid diimides of the formula I

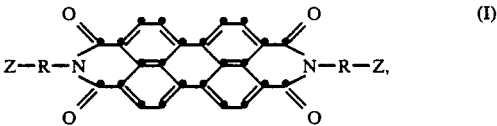

in which R is a linear or branched alkylene, alkylenecycloalkylene or cycloalkylenealkylene radical which has at least 15 C atoms and is interrupted by one or two —COO—, —OOC—, —CONH— and/or —NHCO— groups, and Z is hydrogen, hydroxyl or a —COOH group.

Perylene diimides which are particularly advantageous are those of the formula I in which R is a linear or branched alkylene radical which has 20 to 50 C atoms and which is interrupted by one or two —COO—, —OOC—, —CONH— and/or —NHCO— groups, and Z is as defined above.

Preferred perylene diimides are those of the formula I in which R is a linear alkylene radical which has 24 to 40 C atoms and is interrupted by a —COO— or —OOC— group, and Z is hydrogen.

Perylene diimides which are particularly preferred are those of the formula I in which —RZ is a —(CH$_2$)$_{11}$—COOC$_{12}$H$_{25}$ or —(CH$_2$)$_{11}$—COOC$_{18}$H$_{37}$ group.

A non-exclusive exposition of the numerous and varied meanings of R is given by the following exemplary recitation of the starting materials which can be employed for the preparation of the perylene diimides of the formula I.

Perylene diimides of the formula I in which R contains only one —COO—, —OOC—, —CONH— or —NHCO— group are advantageously obtained, in accordance with the following scheme of reactions, in two stages of synthesis, starting from perylene-3,4,9,10-tetracarboxylic acid or the anhydride thereof, for example by an initial condensation reaction with an aliphatic or cycloaliphatic aminoalcohol of the formula H$_2$N—R$_1$—OH, an aliphatic amino acid of the formula H$_2$N—R$_1$—COOH or an aliphatic diamine of the formula H$_2$N—R$_1$—NH$_2$, and then a further condensation reaction of the resulting diimide with an aliphatic carboxylic acid of the formula HOOC—R$_2$Z, an aliphatic amine of the formula H$_2$N—R$_2$Z or an aliphatic or cycloaliphatic alcohol of the formula HO—R$_2$Z:

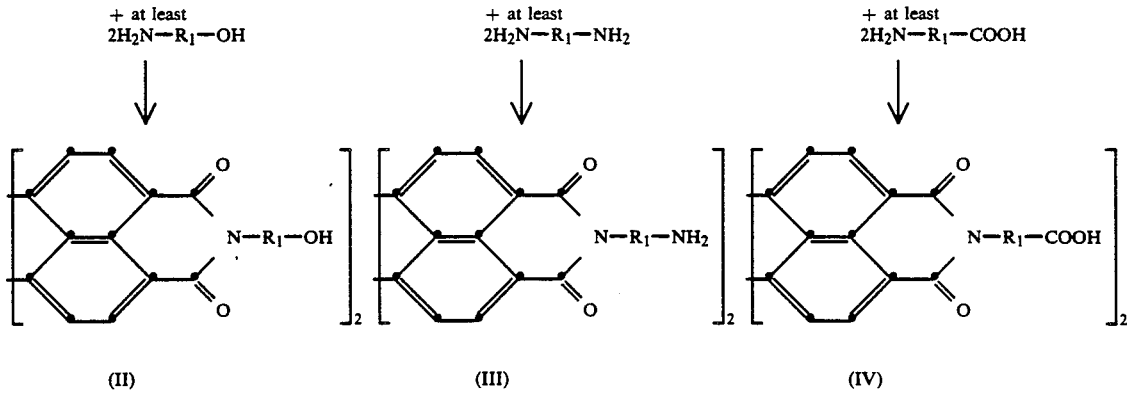

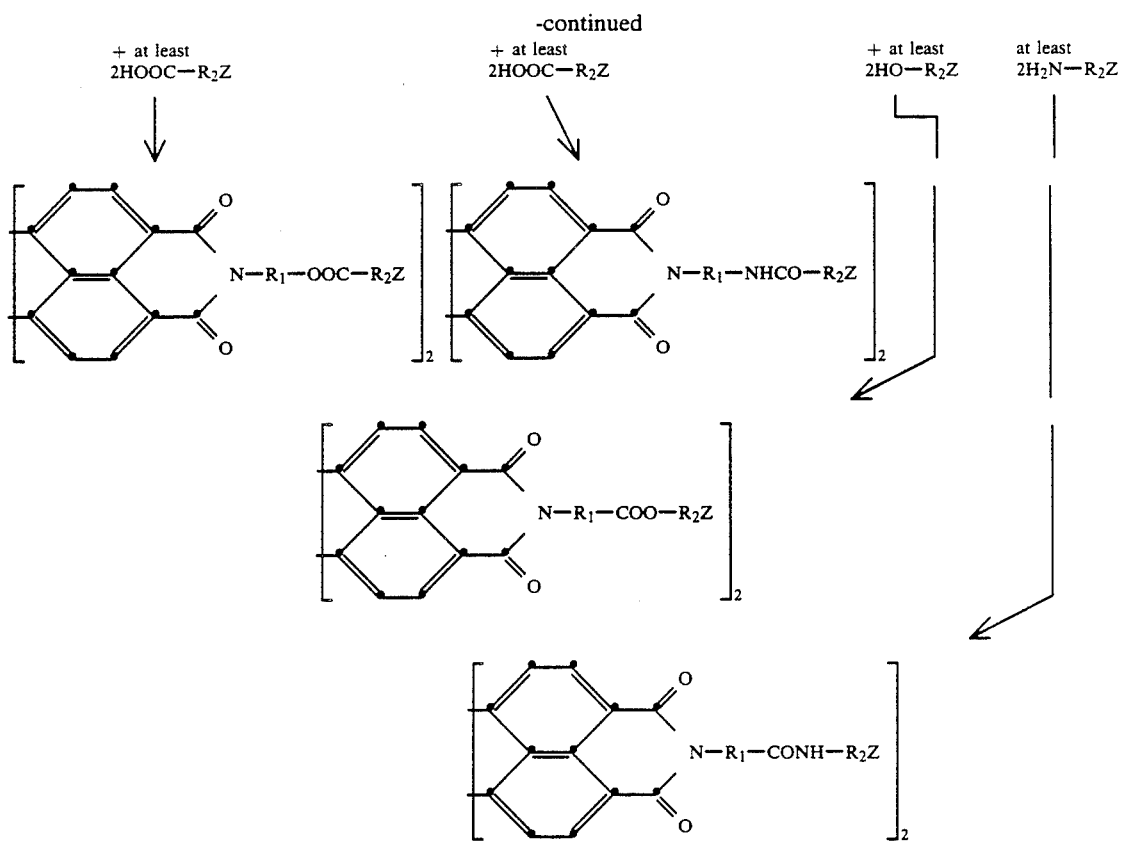

Perylene diimides of the formula I in which R contains two —COO—, —OOC—, —CONH— and/or —NHCO— groups are obtained analogously to the procedure described above, but in three successive condensation reactions, the first condensation step resulting, as described above, in compounds of the formulae II, III or IV.

The compounds of the formulae II and III can be subjected to a further condensation with dicarboxylic acids of the formula HOOC—$R_3$—COOH, with amino acids of the formula HOOC—$R_3$—$NH_2$ or with hydroxycarboxylic acids of the formula HOOC—$R_3$—OH, and the compounds of the formula IV can be subjected to a further condensation with amino acids of the formula HOOC—$R_3$—$NH_2$, with hydroxycarboxylic acids of the formula HOOC—$R_3$—OH, with diamines of the formula $H_2N$—$R_3$—$NH_2$ or with diols of the formula HO—$R_3$—OH ($R_3$=alkylene). Aliphatic carboxylic anhydrides can also be employed for this purpose (for example succinic anhydride or dodecylsuccinic anhydride). In the case of non-terminal amino or hydroxyl groups, branched diimides of the formula I having carbamoyl or carboxyl groups, respectively, at branching points are finally formed. The dicarboxylic acids obtained in each case are then subjected to a condensation with an aliphatic alcohol of the formula HO—$R_2Z$ or an aliphatic amine of the formula $H_2N$—$R_2Z$, the diamines and the diols, on the other hand, being subjected to a condensation with a carboxylic acid of the formula HOOC—$R_2Z$, to give end products of the formula I. The condensation reactions mentioned above are illustrated in an exemplary manner by the schemes shown below.

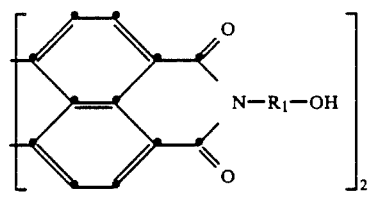

(II)

+ at least
2HOOC—$R_3$—COOH

+ at least
2HOOC—$R_3$—$NH_2$

+ at least
2HOOC—$R_3$—OH

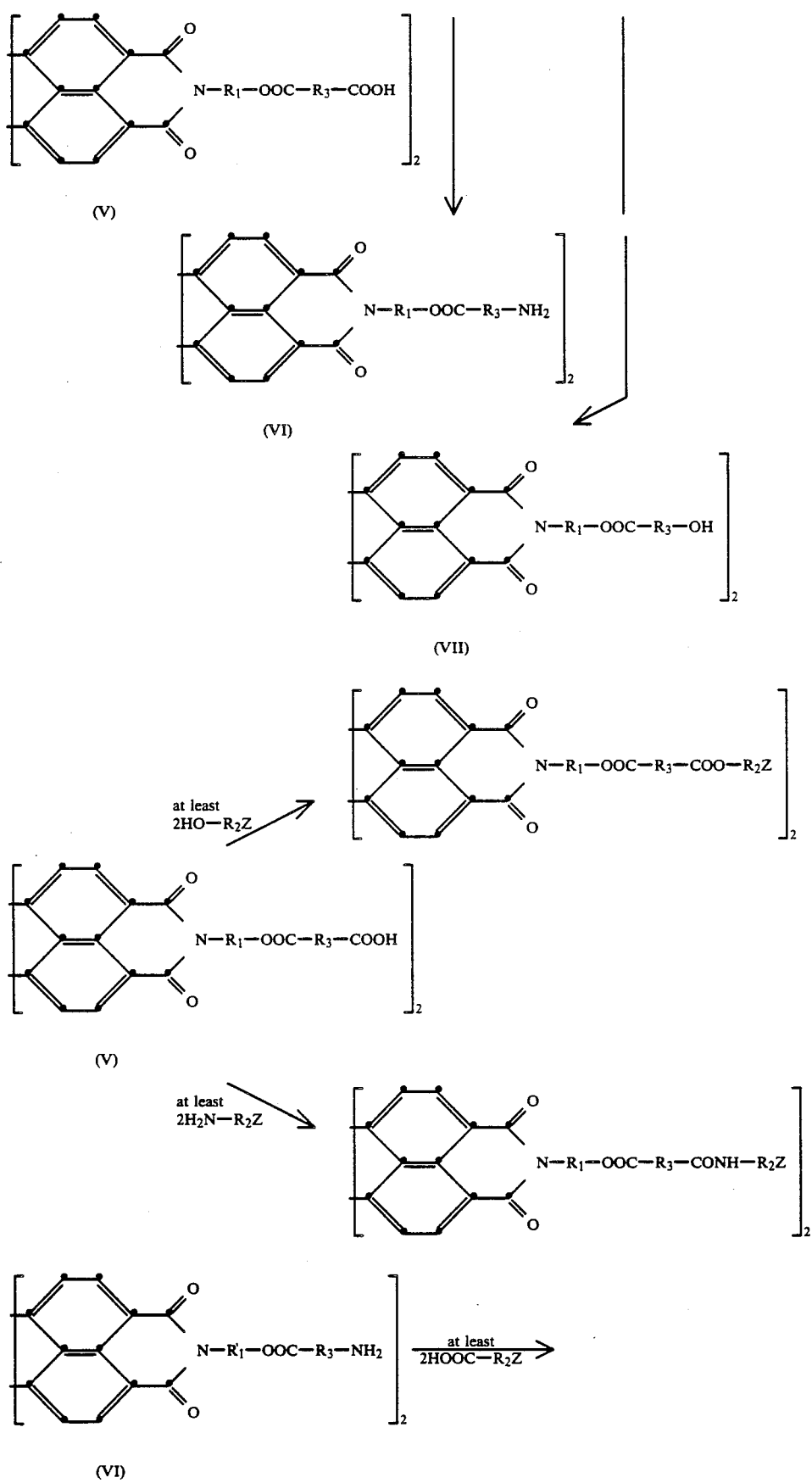

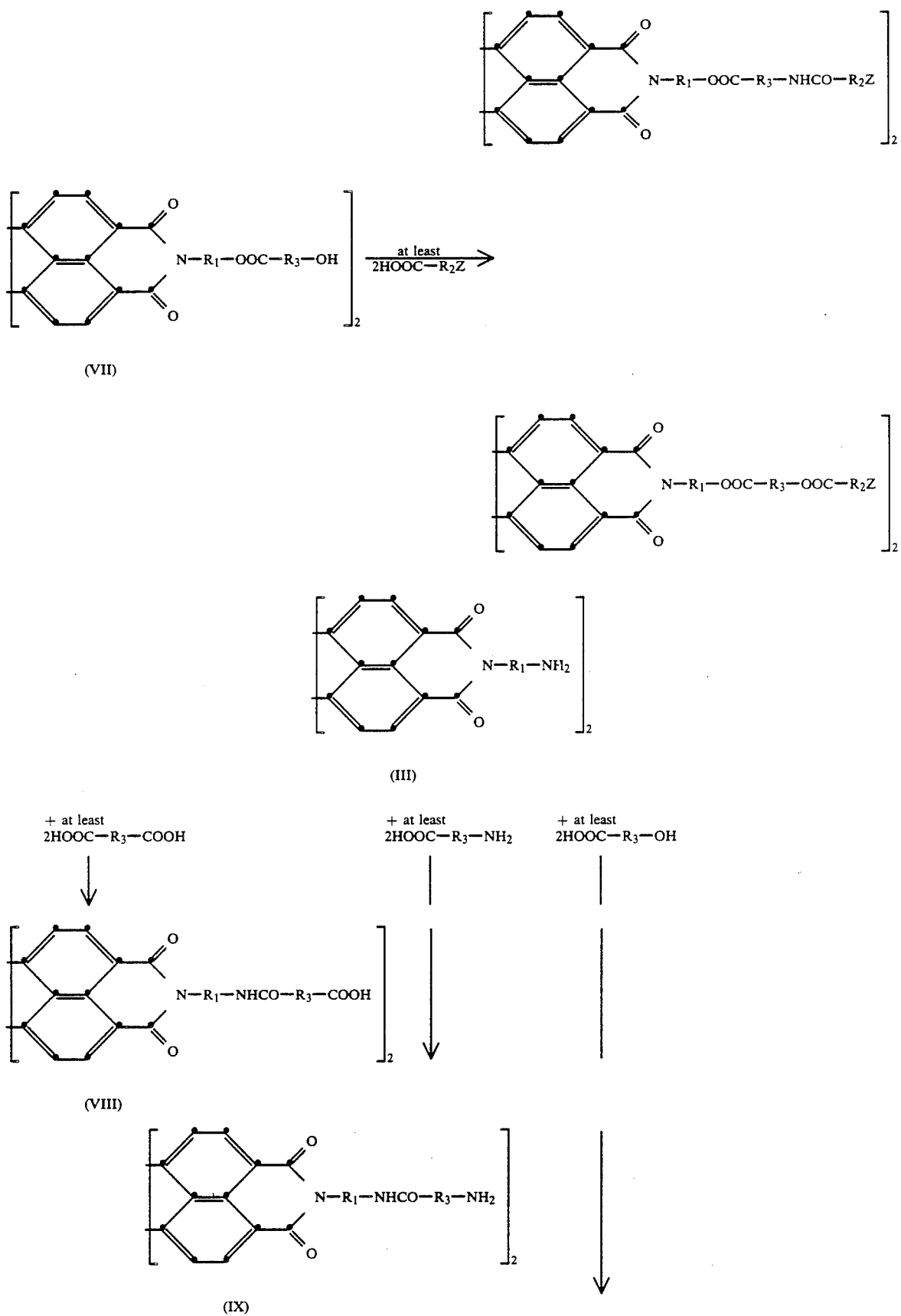

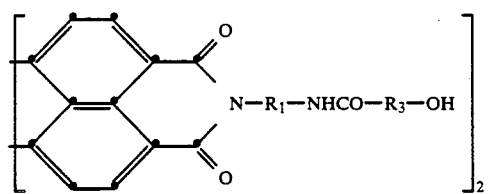
(X)
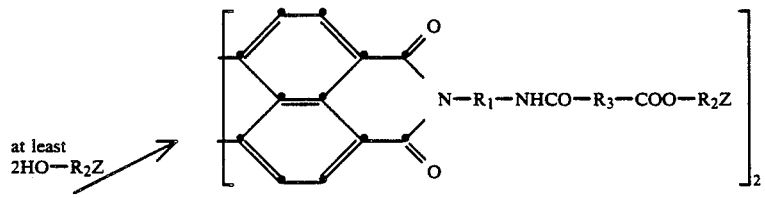
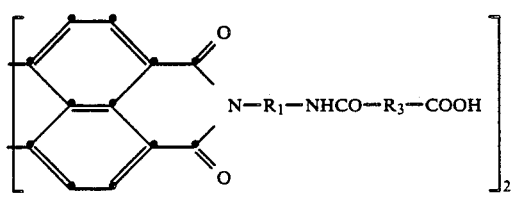
(VIII)
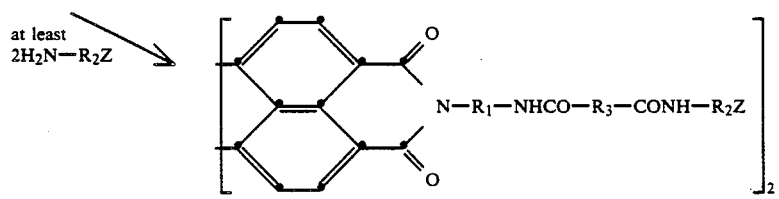
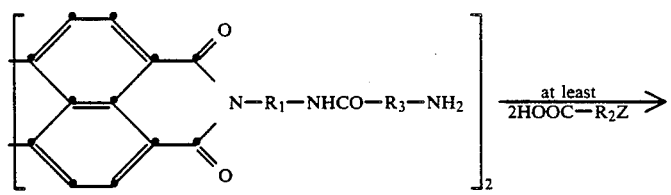
(IX)
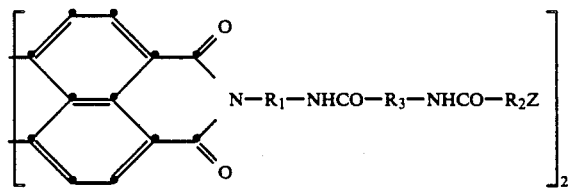
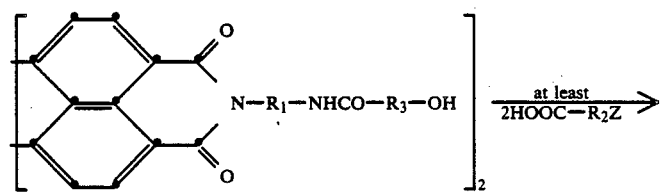
(X)

-continued
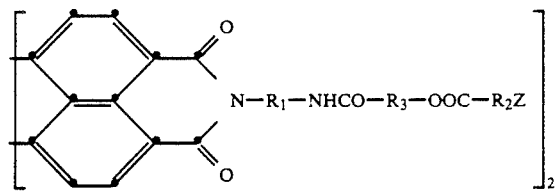
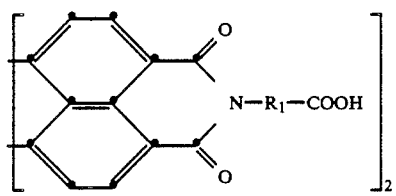
(IV)
+ at least
2H₂N—R₃—COOH
+ at least
2HO—R₃—COOH
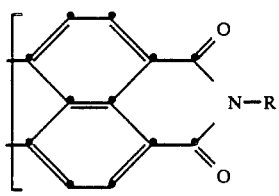 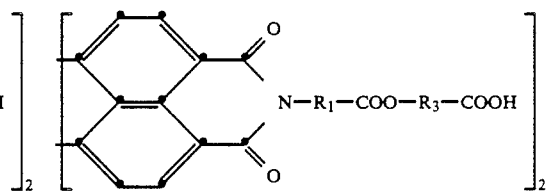
at least
2HO—R₂Z
or
at least
2H₂N—R₂Z
at least
2HO—R₂Z
or
at least
2H₂N—R₂Z
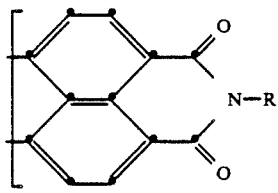 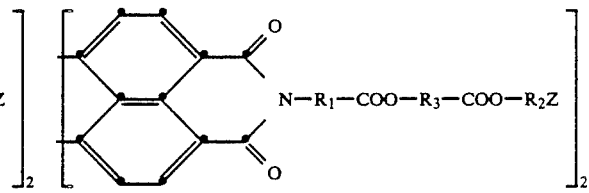
or
or
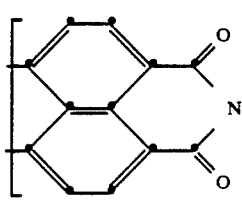 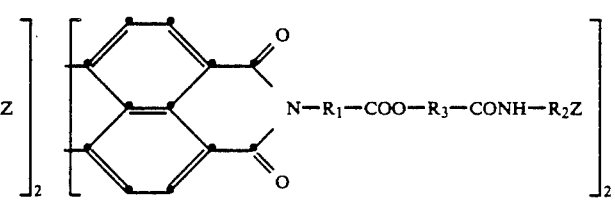

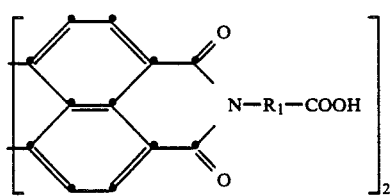

(IV)

+ at least
2H₂N—R₃—NH₂

+ at least
2HO—R₃—OH

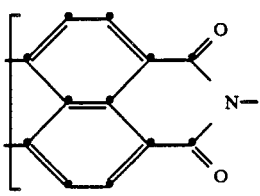

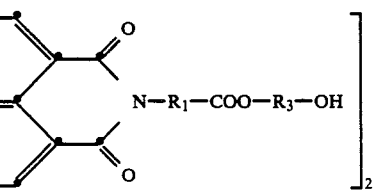

+ at least
2HOOC—R₂Z

+ at least
2HOOC—R₂Z

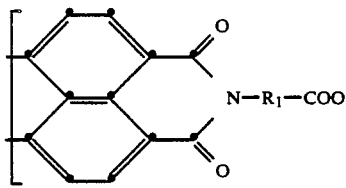

It is a requirement that the starting materials must be selected so that R in formula I contains at least 15 C atoms additionally to those of the carboxyl or carbamoyl groups present.

The following are examples of amino alcohols of the formula $H_2N$—$R_1$—OH: 2-aminoethanol, 3-aminopropyl alcohol, 3-amino-2,2-dimethylpropyl alcohol, 4-aminobutyl alcohol, 5-aminopentyl alcohol, 6-aminohexyl alcohol, 4-aminocyclohexyl alcohol, 7-aminoheptyl alcohol, 7-aminooctyl alcohol, 6-amino-2-ethylhexyl alcohol, 9-aminononyl alcohol, 10-aminodecyl alcohol and 12-aminododecyl alcohol.

The following may be mentioned as examples of aminocarboxylic acids of the formulae $H_2N$—$R_1$—COOH or $H_2N$—$R_3$—COOH: glycine, β-alanine, γ-aminobutyric acid, δ-aminovaleric acid, 6-aminohexanoic acid, 7-aminoheptanoic acid, 8-aminooctanoic acid, 9-aminononanoic acid, 10-aminododecanoic acid, 11-aminoundecanoic acid and 12-aminododecanoic acid.

The following can be mentioned as examples of diamines of the formulae $H_2N$—$R_1$—$NH_2$ or $H_2N$—$R_3$—$NH_2$: ethylenediamine, propylenediamine, trimethylenediamine, hexamethylenediamine and decamethylenediamine.

The following are examples of aliphatic and cycloaliphatic alcohols of the formula HO—$R_2Z$: methanol, ethanol, propyl alcohol, isoprôpyl alcohol, butyl alcohol, pentyl alcohol, 2,2-dimethylpropyl alcohol, hexyl alcohol, cyclohexyl alcohol, octyl alcohol, 2-ethylhexyl alcohol, decyl alcohol, lauryl alcohol, myristyl alcohol, cetyl alcohol, stearyl alcohol, behenyl alcohol and 8-hydroxymethyltricyclo[5,2,1,O$^{2,6}$]decane.

The following are examples of aliphatic amines of the formula $H_2N$—$R_2Z$: methylamine, ethylamine, propylamine, isopropylamine, butylamine, pentylamine, 2,2-dimethylpropylamine, hexylamine, octylamine, decylamine, laurylamine, myristylamine and stearylamine.

The following are examples of aliphatic carboxylic acids of the formula HOOC—$R_2Z$, which can advantageously also be employed in the form of their methyl esters or acid chlorides: formic acid, acetic acid, propionic acid, butyric acid, valeric acid, caproic acid, caprylic acid, pelargonic acid, decanoic acid, dodecanoic acid, tetradecanoic acid, hexadecanoic acid, octadecanoic acid and docosanoic acid.

Examples of suitable diols of the formula HO—$R_3$—OH are hexane-1,6-diol, decane-1,10-diol or dodecane-1,12-diol.

The following are examples of aliphatic dicarboxylic acids of the formula HOOC—$R_3$—COOH: succinic acid, glutaric acid, adipic acid, pimelic acid, suberic acid, sebacic acid and dodecane-1,12-dioic acid, and these can, if appropriate, be employed in the form of their methyl esters, acid chlorides or anhydrides.

Examples of hydroxycarboxylic acids of the formula HOOC—$R_3$—OH are δ-hydroxyvaleric acid, 6-hydroxyhexanoic acid, 9-hydroxynonanoic acid, 12-hydroxydodecanoic acid, 18-hydroxyoctadecanoic acid and 12-hydroxyoctadecanoic acid.

The condensation reactions can be carried out by methods which are generally customary, for example in the presence of organic solvents or using one of the appropriate reactants as the solvent, under normal or elevated pressure and with or without a catalyst.

In certain cases it is also possible to obtain the perylene diimides of the formula I by reacting perylene-3,4,9,10-tetracarboxylic acid or the dianhydride thereof with 2 moles of an amine of the formula $H_2N-RZ$ in which R and Z are as defined above. The following are examples of suitable amines of the formula $H_2N-RZ$: $H_2N-R_1-OOC-R_2Z$, $H_2N-R_1-COO-R_2Z$, $H_2N-R_1-NHCO-R_2Z$, $H_2N-R_1-CONH-R_2Z$, $H_2N-R_1-OOC-R_3-COO-R_2Z$, $H_2N-R_1-OOC-R_3-CONH-R_2Z$, $H_2N-R_1-OOC-R_3-NHCO-R_2Z$, $H_2N-R_1-OOC-R_3-OOC-R_2Z$, $H_2N-R_1-NHCO-R_3-COO-R_2Z$, $H_2N-R_1-NHCO-R_3-CONH-R_2Z$, $H_2N-R_1-NHCO-R_3NHCO-R_2Z$, $H_2N-R_1-NHCO-R_3-OOC-R_2Z$, $H_2N-R_1-CONH-R_3-COO-R_2Z$, $H_2N-R_1-CONH-R_3-CONH-R_2Z$, $H_2N-R_1-CONH-R_3-NHCO-R_2Z$, $H_2N-R_1-COO-R_3-COO-R_2Z$, $H_2N-R_1-COO-R_3-CONH-R_2Z$, $H_2N-R_1-COO-R_3-OOC-R_2Z$. The meaning of $R_1$, $R_2$ and $R_3$ is evident from the examples indicated above of the compounds $H_2N-R_1-OH$, $H_2N-R_1-COOH$, $H_2N-R_3-COOH$, $H_2N-R_1-NH_2$, $H_2N-R_3-NH_2$, $HO-R_2Z$, $H_2N-R_2Z$, $HOOC-R_2Z$, $HO-R_3-OH$, $HOOC-R_3-COOH$ and $HOOC-R_3-OH$.

The following are examples of solvents suitable for the initial condensation reaction for the formation of the corresponding perylene diimides, starting from perylene-3,4,9,10-tetracarboxylic acid or the anhydride thereof: water, dimethylformamide, N-methylpyrrolidone, quinoline, glycols, such as ethylene glycol or propylene glycol, alcohols, such as methanol, ethanol, propyl alcohol, isopropyl alcohol, n-butyl alcohol and isomers thereof or diacetone alcohol, and aromatic hydrocarbons, such as nitrobenzene, chlorobenzene, dichlorobenzenes, trichlorobenzenes, toluenes and xylenes.

The following may be mentioned as solvents for the second and third condensation reaction: cyclohexane and aromatic hydrocarbons, such as nitrobenzene, chlorobenzene, dichlorobenzenes, trichlorobenzenes, toluenes, xylenes, cumene and tert-butylbenzene.

The following are examples of catalysts suitable for the esterification reactions: toluenesulfonic acids, methanesulfonic acid, ammonium bisulfate, dibutyl tin oxide, titanium-IV butoxide and concentrated sulfuric acid.

If one reactant is directly used (in excess) as the solvent in the condensation reactions, it is preferably, after the formation of the ester or amide is complete, to dilute the reaction medium with one of the organic solvents mentioned above until the component present in excess is in a dissolved state; the remaining pigment suspension is then filtered off. The excess component can be recovered from the filtrate by removing the solvent by evaporation.

The resulting perylene diimides according to the invention are isolated and dried by customary methods. By virtue of their excellent compatibility with polyolefins, they can be directly incorporated into polyolefins, for colouring the latter, without further conditioning, such as mechanical comminution or preparation.

Although the perylene diimides according to the invention are particularly suitable for colouring polyolefins, they can also be used advantageously for colouring other polymers, particularly engineering plastics, for example polycarbonates, polyacrylates, polymethacrylates, ABS, polyesters, polyamides, polyetherketones or polyurethanes, on their own or as mixtures.

Examples which may be mentioned of polyolefins which can be coloured with the perylene diimide according to the invention are high-density and low-density polyethylene (HD-PE, LD-PE and LLD-PE), polypropylene and polyisobutylene and also copolymers of polyolefins with, for example, polyethers, polyether-ketones or polyurethanes.

Coloration is carried out by the customary processes, for example by mixing the perylene diimide with the plastic in the form of granules or powder and extruding the mixture to give fibres, sheeting or granules. The latter can then be shaped into articles by the injection moulding process.

The colorations obtained display good brightness and high saturation and are distinguished by good stability, particularly to heat and light, and by their low tendency to bloom. It is a particular advantage of polyethylene articles coloured with the perylene diimides according to the invention that they exhibit, particularly in the case of HD-PE, no increased tendency to distortion or deformation phenomena.

Fibres which have been coloured with the perylene diimides according to the invention possess excellent textile properties, for example fastness to light and fastness properties to detergents and solvents in wet processing.

In addition, the perylene diimides according to the invention have the surprising property that they dissolve completely in the substrate, giving a colour of strong orange fluorescence, at temperatures above $\sim 120°$ C.—i.e. even during the coloration process—when employed in the customary concentrations of 0.1 to 2% by weight, relative to the polymer, whereas they crystallize out as a red pigment in the polyolefin below $\sim 120°$ C. This property makes the perylene diimides according to the invention particularly interesting for the mass coloration of polyolefin fibres. Because the colouring substances are dissolved in the polymer melt, no filtering problems arise during the spinning process, and the finest filaments can be spun.

Since the dissolution process of the perylene diimides according to the invention in the coloured polyolefin is reversible, these compounds can be used as thermochromic colouring substances, it being possible to use the colour change

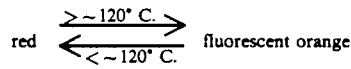

as a direct warning signal, when the fibres, sheeting or injection moulded articles coloured with the perylene diimides according to the invention are heated above the threshold of 120° C.

The use of certain polyolefins or other polymers or copolymers or mixtures thereof makes it possible, depending on the structure of the perylene diimide, to influence the temperature of the colour change from red to fluorescent orange and the reverse change. In engineering plastics, preferably in polycarbonates, polyacrylates or polymethacrylates, the perylene diimides according to the invention remain in the dissolved form even after cooling and produce orange fluorescent colorations which have a strong fluorescence and excellent fastness to light and weathering. Accordingly, the present invention also relates to the use of perylene diimides of the formula I for colouring engineering plastics.

The following examples serve to illustrate the invention.

EXAMPLE 1 a) 39.2 g of perylenetetracarboxylic dianhydride, 47 g of 12-aminododecanoic acid and 1,000 ml of methanol are stirred for 24 hours at 150° C. in a steel autoclave, and are then cooled to room temperature. The pigment suspension is then filtered. The pressed cake is washed with methanol, dried at 80° C. in a vacuum drying cabinet and powdered. This gives 76 g of perylenetetracarboxylic acid N,N'-bisdodecanoic acid imide, microanalysis of which gives the following result:
C: calculated 73.26%; found 73.23%
H: calculated 6.92%; found 7.10%
N: calculated 3.56%; found 3.39% b) 23.6 g of the perylenetetracarboxylic acid N,N'-bisdodecanoic acid imide obtained in accordance with Example 1a), 150 g of 1-octadecanol and 1.5 g of p-toluenesulfonic acid.1H$_2$O are heated to 120° C. in a glass vessel holding 750 ml and equipped with a stirrer, and are stirred at this temperature for 20 hours. The water of reaction is removed from the glass vessel by distillation. The red mixture is then cooled to 80° C., and 500 ml of methanol are added. In the course of this the excess octadecanol dissolves. The mixture is stirred for a further 30 minutes at reflux temperature and the pigment is filtered off through a preheated suction filter. The pressed cake is washed free from octadecanol with warm methanol, dried at 80° C. in a vacuum drying cabinet and powdered. This gives 38.3 g of perylenetetracarboxylic acid N,N'-bis-(dodecanoic acid stearyl ester)-imide, which can be incorporated satisfactorily into polyolefin materials and gives red colorations of good brightness and high saturation which have excellent fastness to heat, light and weathering and a low tendency to bloom.

Microanalysis gives the following result:
C: calculated 78.09%; found 78.13%
H: calculated 9.83%; found 9.73%
N: calculated 2.17%; found 2.12%

EXAMPLE 2

23.6 g of the perylenetetracarboxylic acid N,N'-bisdodecanoic acid imide obtained in accordance with Example 1a), 150 g of 1-dodecanol and 2 g of p-toluenesulfonic acid.1H$_2$O are heated to 120° C. in a glass vessel holding 750 ml and equipped with a stirrer, and are stirred at this temperature for 20 hours. The water of reaction is removed from the glass vessel by distillation. The mixture is then cooled to 80° C., and 500 ml of methanol are added. In the course of this the excess dodecanol dissolves. The mixture is stirred for a further 30 minutes at reflux temperature and the pigment is filtered off through a preheated suction filter. The pressed cake is washed free from dodecanol with warm methanol, dried at 80° C. in a vacuum drying cabinet and powdered. This gives 31.0 g of perylenetetracarboxylic acid N,N'-bis-(dodecanoic acid lauryl ester)-imide, which, when used for the mass coloration of polyolefins, also gives red colorations of good brightness having good fastness to heat, light and weathering and a low tendency to bloom.

Microanalysis gives the following values:
C: calculated 76.97%; found 76.62%
H: calculated 9.15%; found 9.07%
N: calculated 2.49%; found 2.54%

EXAMPLE 3

The procedure described in Example 1b) is repeated, except that an equivalent amount of 1-docosanol is used instead of 1-octadecanol, giving 26 g of perylenetetracarboxylic acid N,N'-bis-(dodecanoic acid behenyl ester)-imide, which can be incorporated excellently into polyolefins and gives red colorations having excellent fastness to heat, light and weathering and a low tendency to bloom.

Microanalysis gives the following values:
C: calculated 78.7%; found 78.2%
H: calculated 10.2%; found 10.1%
N: calculated 2.0%; found 2.1%

EXAMPLE 4

The procedure described in Example 1b) is followed, except that 200 g of 8-hydroxymethyltricyclo[5,2,1,0$^{2,6}$]decane (®TCD-alcohol M made by HOECHST) are used instead of 150 g of 1-octadecanol, giving 30 g of perylenetetracarboxylic acid N,N'-bis-(dodecanoic acid tricyclo[5,2,1,O$^{2,6}$]decanemethyl ester)-imide, which, when used for the mass coloration of polyolefins, gives red colorations having good fastness properties and a low tendency to bloom.

Microanalysis gives the following values:
C: calculated 77.6%; found 77.5%
H: calculated 8.0%; found 8.1%
N: calculated 2.6%; found 2.7%

EXAMPLE 5

7.8 g of the perylenetetracarboxylic acid N,N'-bisdodecanoic acid imide obtained in accordance with Example 1a), 60 g of stearylamine and 1.0 g of p-toluenesulfonic acid.1H$_2$O are heated to 140° C. in a glass vessel holding 750 ml and equipped with a stirrer, and are stirred at this temperature for 22 hours. The reaction mixture is cooled to 60° C., diluted with 500 ml of methanol, stirred for 1 hour at reflux temperature and filtered while hot through a preheated suction filter. The pressed cake is washed free from stearylamine with warm methanol and dried at 80° C. in a vacuum drying cabinet. This gives 11.5 g of perylenetetracarboxylic acid N,N'-bis(dodecanoic acid stearylamide)-imide, which, when incorporated into polyolefins, gives very deeply coloured red colorations of excellent fastness to heat, light and weathering and a low tendency to bloom.

Microanalysis gives the following values:
C: calculated 78.2%; found 77.6%
H: calculated 10.0%; found 9.7%
N: calculated 4.3%; found 4.2%

EXAMPLE 6 a) 15.8 g of perylenetetracarboxylic dianhydride, 9.0 g of neopentanolamine and 160 ml of methanol are stirred at 160° C. for 18 hours in a steel autoclave. The pigment suspension is cooled and filtered; the pressed cake is thoroughly washed with methanol, dried at 80° C. in a vacuum drying cabinet and powdered. This gives 210 g of perylenetetracarboxylic acid N,N'-bisneopentanolimide, microanalysis of which gives the following values:

C: calculated 72.58%; found 72.0%
H: calculated 5.38%; found 5.3%
N: calculated 4.98%; found 5.0% b) 5.6 g of the perylenetetracarboxylic acid N,N'-bis-neopentanolimide obtained in Example 6a), 60 g of stearic acid and 1.0 g of p-toluenesulfonic acid.1H₂O are heated to 120° C. in a glass vessel holding 350 ml and equipped with a stirrer, and are stirred at this temperature for 22 hours. The water present is removed continuously from the reaction vessel by passing a stream of nitrogen through the latter. When the reaction is complete, the mixture is cooled to 60° C., diluted with 300 ml of methanol, stirred at reflux temperature for 30 minutes and filtered through a preheated suction filter. The pressed cake is washed free from stearic acid with warm methanol, dried at 80° C. in a vacuum drying cabinet and powdered. This gives 10.2 g of perylene diimide of the formula

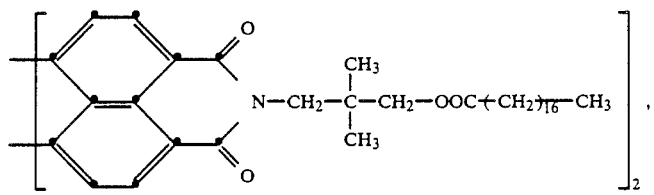

which, when incorporated into polyolefins, gives very deeply coloured red colorations of good brightness and high saturation having excellent fastness to heat, light and weathering and a low tendency to bloom.

Microanalysis gives the following values:
C: calculated 76.74%; found 76.52%
H: calculated 9.02%; found 9.08%
N: calculated 2.56%; found 2.56%

EXAMPLE 7

5.1 g of perylenetetracarboxylic acid N,N'-bis-(γ-hydroxypropyl)-imide, which can be obtained in accordance with Example 2 of German Auslegeschrift 2,451,780, 45 g of dodecane-1,12-dioic acid and 0.9 g of p-toluenesulfonic acid.1H₂O are stirred at 150° C. for 20 hours in a glass vessel holding 750 ml. The water present is removed from the glass vessel by passing a stream of nitrogen through the latter. When the condensation reaction is complete, the mixture is cooled, 400 ml of diacetone alcohol are added and the mixture is stirred for 30 minutes at 120° C. and filtered while hot through a preheated suction filter. The pressed cake is washed free from dodecanedicarboxylic acid with warm diacetone alcohol, dried at 80° C. in a vacuum drying cabinet and powdered. This gives 8.9 g of perylene diimide of the formula

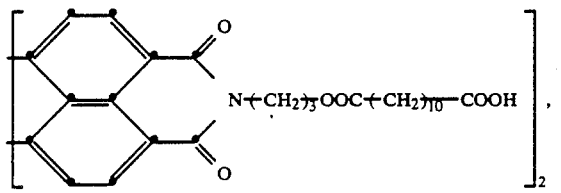

which can be incorporated excellently into polylefins and gives red colorations having excellent fastness properties and a low tendency to bloom, microanalysis of which gives the following result:

C: calculated 69.97%: found 69.37%
H: calculated 6.67%; found 6.75%
N: calculated 3.01%; found 2.98%

EXAMPLE 8 a) 7.9 g of perylenetetracarboxylic acid N,N'-bis-dodecanoic acid imide, 45 g of the diol of the formula HO—(CH₂)₁₄—OH and 1.0 g of p-toluenesulfonic acid.1H₂O are heated to 120° C. in a glass vessel holding 750 ml and equipped with a stirrer, and are stirred at this temperature for 18 hours. The water present is removed continuously from the reaction vessel by passing a stream of nitrogen through the latter. When the reaction is complete, the mixture is cooled to 60° C., diluted with 400 ml of methanol, stirred at reflux temperature for 30 minutes and filtered through a preheated suction filter. The pressed cake is washed free from diol with warm methanol, dried at 80° C. in a vacuum drying cabinet and powdered. This gives 10.9 g of perylene diimide of the formula

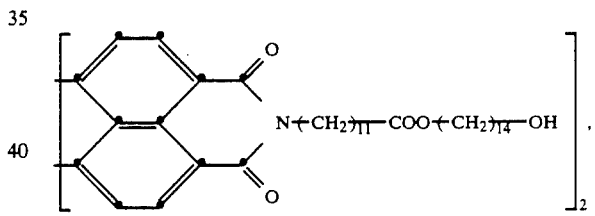

which, when incorporated into polyolefins, gives very deeply coloured red colorations having excellent fastness to heat, light and weathering.

Microanalysis gives the following values:
C: calculated 75.33%; found 75.65%
H: calculated 9.15%; found 9.09%
N: calculated 2.31%; found 2.11% b) 3.6 g of the perylene diimide obtained in Example 8a) and 80 ml of acetic anhydride are stirred at reflux temperature for 21 hours in a glass vessel holding 350 ml and equipped with a stirrer. The pigment suspension is then cooled and filtered. The pressed cake is washed with glacial acetic acid, dried at 80° C. in a vacuum drying cabinet and powdered. This gives 3.7 g of perylene diimide of the formula

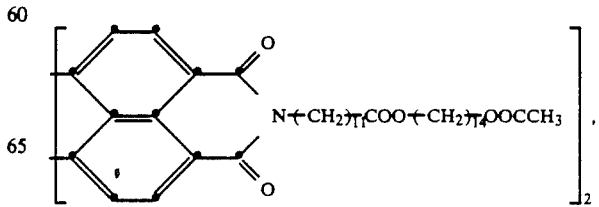

which, when incorporated into polyolefins, gives very deeply coloured red colorations having excellent fastness to heat, light and weathering.

Microanalysis gives the following values:
C: calculated 74.15%; found 74.70%
H: calculated 8.87%; found 8.86%
N: calculated 2.16%; found 2.08%

EXAMPLE 9

A mixture of 1.0 g of the perylene diimide obtained in Example 1b), 1.0 g of an antioxidant (®IRGANOX 1010, CIBA-GEIGY AG) and 1,000 g of HD polyethylene granules (®VESTOLEN A 60-16, HÜLS) is premixed for 15 minutes in a 3 liter glass bottle on a roller stand. The mixture is then extruded twice through a single-screw extruder and is then granulated. The granules thus obtained are then injection-moulded on an ®Allround Arburg 200 injection-moulding machine at 220° C., 250° C. and 300° C. at a residence time of 5 minutes in each case to give panels. The panels thus obtained exhibit red colorations of uniform depth of colour and are just as free from distortion as articles injection-moulded from the uncoloured polyethylene. No blooming of the pigment from the plastic can be observed when the injection-moulded panels coloured in this way are stored in an oven for 24 hours at 100° C. If the panels coloured as described above are heated to 130° C., their red colour changes into a brilliantly fluorescent orange which immediately changes back into the red initial colour at temperatures below 120° C.

EXAMPLE 10

The procedure described in Example 9 is followed, except that 10 g of ®KRONOS RN 57-P (KRONOS Titan GmbH) titanium dioxide are used in addition to the coloured pigment, giving red panels having equally good fastness to heat. Panels compression-moulded between 200° and 300° C. exhibit no colour variations after cooling.

EXAMPLE 11

1,000 g of polypropylene granules (®DAPLEN PT-55, Chemie LINZ) and 1.0 g of the perylene diimide obtained in Example 1b) are mixed for 15 minutes in a 3 liter bottle on a roller stand. The mixture is then extruded twice through a single-screw extruder and is then granulated. The granules thus obtained are spun at 280°–285° C. by the melt-spinning process. During the spinning process, the colouring substance is dissolved in the substrate in an orange flurescent colour and crystallizes out completely as a red colouring substance in the fibre material on cooling (below 120° C.). The fibres coloured in this way have very good fastness to light and excellent textile fastness properties, such as fastness to rubbing and fastness to detergents and solvents in wet processing. The fastness to heat at 285° C. is excellent.

EXAMPLE 12

100 g of polymethylmethacrylate granules (DEGALAN 7E ® made by DEGUSSA AG) and 0.2 g of the perylene diimide obtained in Example 1b) are premixed for 20 minutes in a 500 ml glass bottle on a roller stand. The mixture is then extruded on a single-screw extruder to give a ribbon. This gives a transparent plastic ribbon which has a strong orange fluorescence and exhibits excellent fastness to heat and light. Orange fluorescent ribbons having analogously good properties are obtained if the perylene imides according to Example 2 to 8b) are used instead of the perylene imide according to Example 1b).

EXAMPLE 13

The procedure described in Example 12 is followed, except that polycarbonate granules (MAKROLON 2800 ® made by BAYER) are used instead of polymethylmethacrylate, giving transparent ribbons which have a strong orange fluorescence and excellent fastness to heat and light.

What is claimed is:

1. A polyolefin containing a perylene-3,4,9,10-tetracarboxylic acid diimide of the formula I

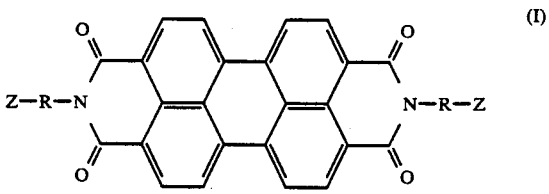

in which RZ is a —(CH$_2$)$_{11}$—COOC$_{12}$H$_{25}$ or —(CH$_2$)$_{11}$—COOC$_{18}$H$_{37}$ group.

2. An engineering plastics containing a perylene-3,4,9,10-tetracarboxylic acid diimide of the formula I

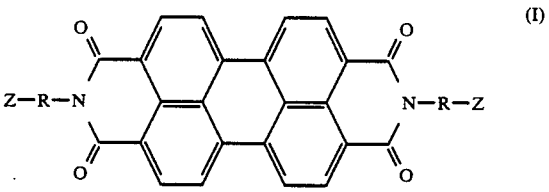

in which RZ is a —(CH$_2$)$_{11}$—COOC$_{12}$H$_{25}$ or —(CH$_2$)$_{11}$—COOC$_{18}$H$_{37}$ group.

3. A polyolefin containing, as a coloring substance, a perylene-3,4,9,10-tetracarboxylic acid diimide of the formula I

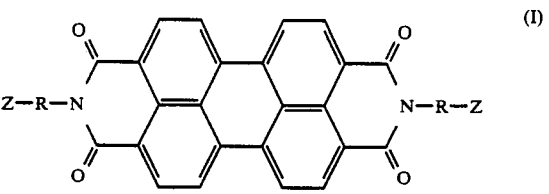

in which R is a linear alkylene radical which has 20 to 50 C atoms and which is interrupted by a —COO— or —OOC— group and Z is hydrogen or hydroxyl.

4. An engineering plastics containing, as a coloring substance, a perylene-3,4,9,10-tetracarboxylic acid diimide of the formula I

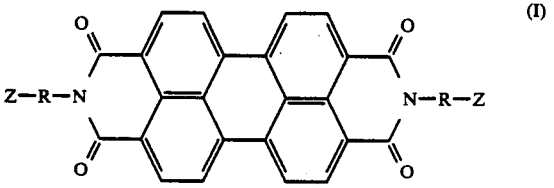

in which R is a linear alkylene radical which has 20 to 50 C atoms and which is interrupted by a —COO— or —OOC— group and Z is hydrogen or hydroxyl.

* * * * *